(12) United States Patent
Rosa

(10) Patent No.: US 6,626,249 B2
(45) Date of Patent: Sep. 30, 2003

(54) DRY GEOTHERMAL DRILLING AND RECOVERY SYSTEM

(76) Inventor: Robert John Rosa, P.O. Box 8145, Santa Maria, CA (US) 93456

( * ) Notice: Subject to any disclaimer, the term of this patent is extended or adjusted under 35 U.S.C. 154(b) by 161 days.

(21) Appl. No.: 09/841,856

(22) Filed: Apr. 24, 2001

(65) Prior Publication Data
US 2003/0000741 A1 Jan. 2, 2003

(51) Int. Cl.$^7$ ............................. E21B 7/15; E21C 37/16
(52) U.S. Cl. ............................................. 175/16; 299/14
(58) Field of Search ........................... 175/16, 257, 71; 166/302, 308, 60; 299/14

(56) References Cited

U.S. PATENT DOCUMENTS

| | | | |
|---|---|---|---|
| 1,887,650 A | * 11/1932 | Larner et al. | 362/241 |
| 3,693,718 A | 9/1972 | Stout | |
| 3,871,485 A | 3/1975 | Keenan, Jr. | |
| 3,882,945 A | * 5/1975 | Keenan, Jr. | 175/16 |
| 3,977,478 A | 8/1976 | Shuck | |
| 3,998,281 A | * 12/1976 | Salisbury et al. | 175/16 |
| 4,066,138 A | * 1/1978 | Salisbury et al. | 175/16 |
| 4,090,572 A | * 5/1978 | Welch | 175/16 |
| 4,199,034 A | * 4/1980 | Salisbury et al. | 175/11 |
| 4,745,655 A | 5/1988 | Johnson | |
| 5,069,582 A | 12/1991 | Young | |
| 5,685,362 A | * 11/1997 | Brown | 165/45 |
| 5,768,743 A | 6/1998 | Webster | |
| 5,837,654 A | 11/1998 | Carroll et al. | |

OTHER PUBLICATIONS

Paul Perreault, Technology Watch, Lasers Join Hunt For Energy. Popular Mechanics, Jun. 2001,vol. 178, No. 6 p. 16 Published by The Hearst Corp.

* cited by examiner

Primary Examiner—David Bagnell
Assistant Examiner—Daniel P. Stephenson
(74) Attorney, Agent, or Firm—Robert M. Sperry, Esq.

(57) ABSTRACT

A geothermal drilling and recovery system comprising a drilling rig having an elevator with a laser and a radar gun mounted on said elevator, a drill pipe, a rotating mirror mounted adjacent the lower end of said drill pipe and means for establishing a vacuum adjacent said lower end of said drill pipe to remove and recover heat and drilling debris therefrom.

1 Claim, 5 Drawing Sheets

FIG 3
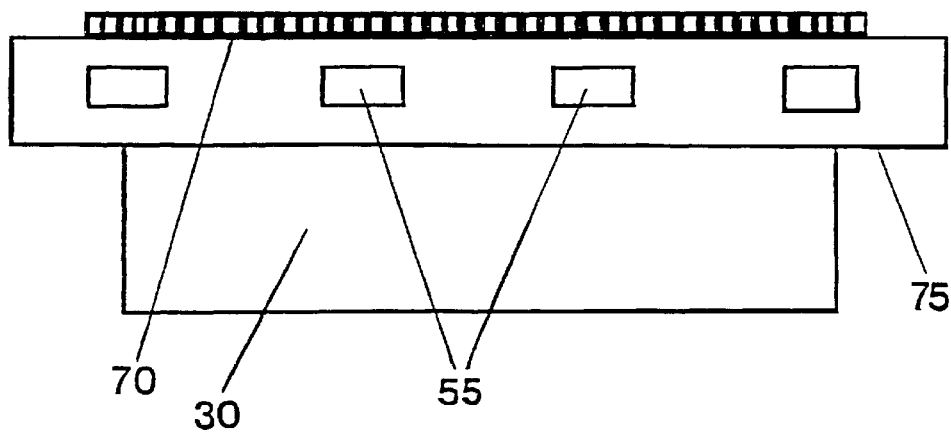
FIG 3a
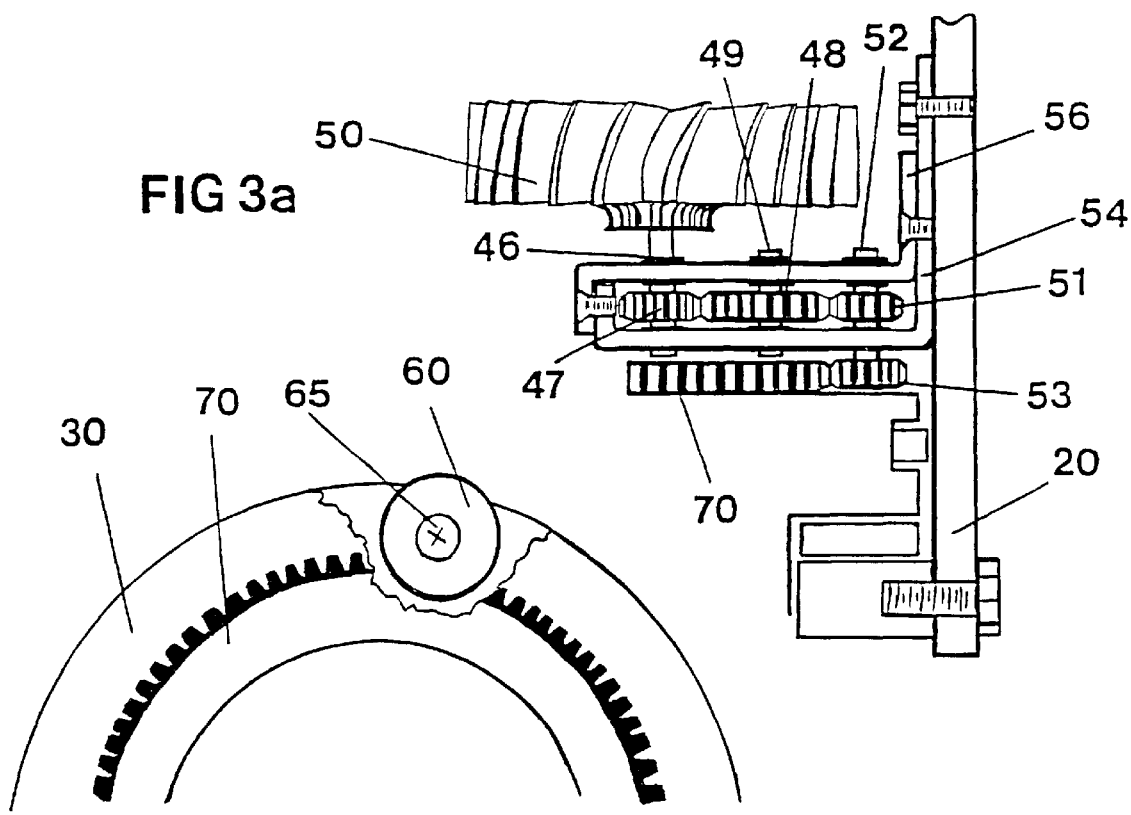
FIG 3b

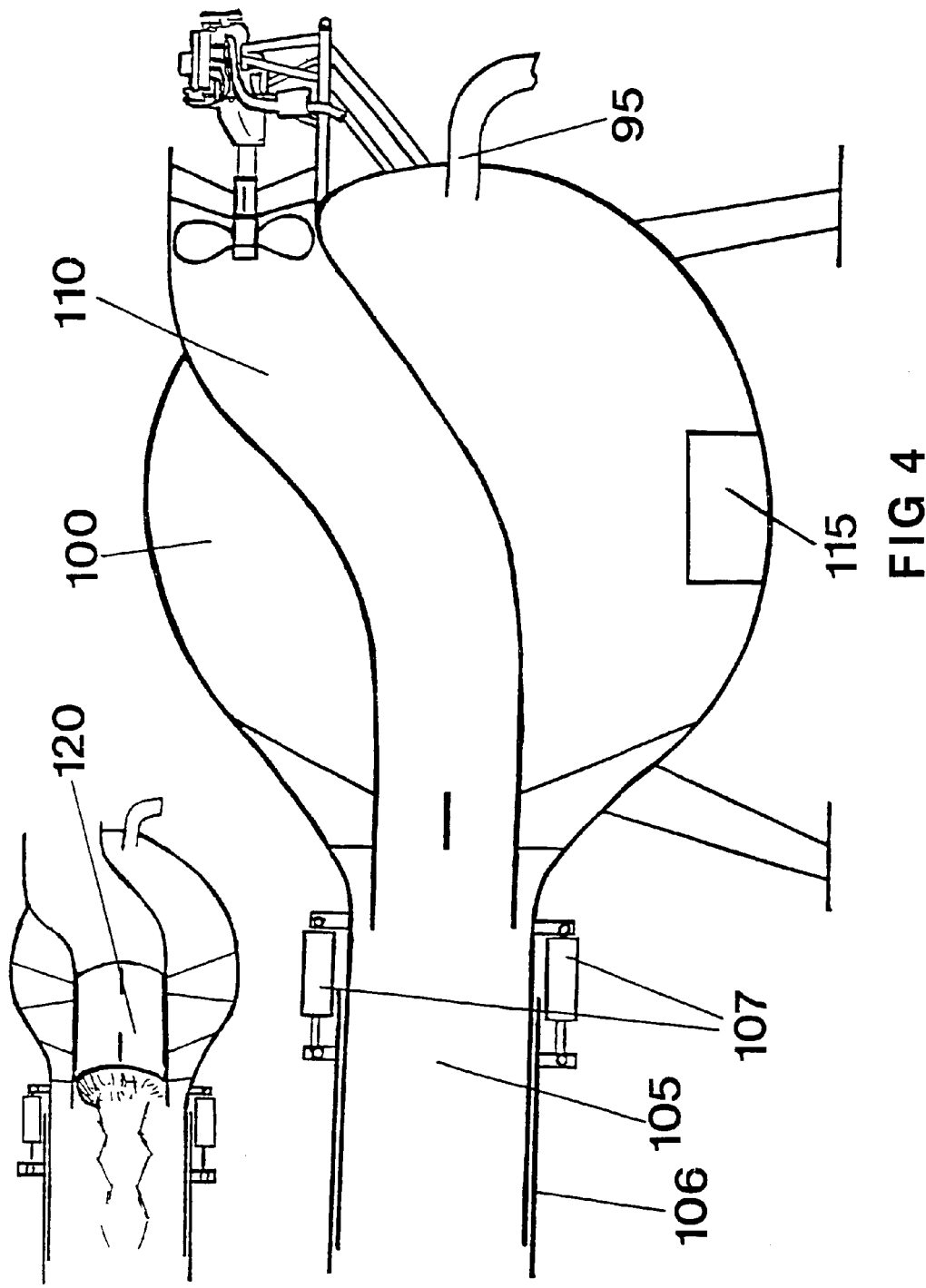

DRY GEOTHERMAL DRILLING AND RECOVERY SYSTEM

FIELD OF INVENTION

The present invention relates in general to reaching and recovering the natural heat found in rock deep within the earth, more specifically to laser drilling a dry hole under a vacuum and using the heat with a closed circulating heat recovery system, to produce geothermal electricity.

BACKGROUND

Geothermal energy is the earths most plentiful renewable resource and has not fully reached its potential. The heat deep within the earth has been known of for many centuries, this heat has been displayed as volcanos, geysers, and even hot springs. In some geothermal locations found around the earth, pools of super hot water have been trapped beneath a cap, or a layer of impermeable rock these areas are known as wet geothermal zones. This is where geothermal energy has it's infancy. Wells have been successfully drilled into these pools. The heated water has been used in various ways to generate mechanical power, then harnessed to generate electricity. However the industry is still struggling with problems, such as the minerals and salts carried in the water, causing maintenance difficulties. The depletion of the well pressure and replenishing the reservoir have been problems. Also the geothermal industry has been limited to the wet geothermal zones, which are not always near the metropolitan areas where electric power is needed. This has left the dry geothermal zones virtually untapped.

The present invention is well suited to take geothermal energy to the next level, by utilizing old and well known technologies, with a few new apparatuses to circumvent the barriers of drilling an ultra deep hole into the dry geothermal zone, found everywhere beneath the surface of the earth.

Heretofore, drilling a bore-hole into the earth is a well known art, and accomplished in several ways, all having limitations to drilling an ultra deep hole. The most common method of drilling is used in the search of oil and gas, this method uses a drilling fluid or mud, the mud is pumped down the drill pipe to flush the drill cuttings from the hole. This mud or fluid could not withstand the temperatures of an ultra deep hole. U.S. Pat. No. 5,837,654 to Carroll et al, shows a high temperature drilling fluid, that would also fall short of the temperatures expected. Other setbacks include the weight of a fluid column this tall would be difficult to pump, even the added weight of conventional drill pipe may cause problems, also the time it takes to periodically pull the drill string to replace the rotary drill bit is a setback.

Lasers have been used for drilling, one has a plurality of lasers focused to bore horizontally, U.S. Pat. No. 3,693,718 to Stout. U.S. Pat. No. 3,871,485 to Keenan Jr, shows a generator and laser mounted within the drill string, with mud or drilling fluid driving a turbine to power it. U.S. Pat. No. 3,977,478 to Shuck, shows a sealed hole that has been pressurized for laser drilling, however even more pressure is required as the hole deepens, setting limitations.

A vacuum is utilized in the present invention, used to remove vapors, ash and gases from the hole, also to create a sub-atmospheric condition within the hole this air flow will also keep smoke and vapors away from the reflecting surfaces. Many devices have been used to achieve a vacuum, such as these U.S. Pat. No. 5,069,582 to Young, U.S. Pat. No. 4,745,655 to Johnson, and U.S. Pat. No. 5,768,743 to Webster, all of these use a positive air flow, have chambers and air ducts, some use compressed air and one uses a fan. All of these vacuum producing devices lack the power needed for the task at hand.

For heat recovery from geothermal wells, wet or dry, many systems have been developed but insofar as the applicant is aware, none of these incorporate a closed double D pipe circulation system.

OBJECTS AND ADVANTAGES

Accordingly the objects and advantages of the present invention are.

a. To provide a down hole environment suitable for the effective use of a laser beam, with a vacuum strong enough to maintain a sub-atmospheric pressure while allowing a constant air flow to remove the smoke, vapors and ash caused by laser drilling.

b. To drill with a significantly lighter drill pipe than conventional drill pipe, allowing a deeper hole.

c. To accomplish deep hole drilling without the need to pull the drill string to replace worn drill bits.

d. To operate a laser reflecting device at the bottom of a drill string remotely, with no mechanical device extending from the surface.

e. To eliminate the use of geothermal water and brine, with their corrosive effects to current geothermal systems.

f. To provide a more efficient heat transfer system from dry geothermal zones.

g. To provide the means to locate geothermal power plants almost anywhere.

h. The main objective of the present invention is to provide the means to produce endless inexpensive electricity, using no fuels and having no pollution or waste products to dispose of, thus improving the environment and conserving natural resources.

DRAWING FIGURES

FIG. 3 shows a side view of the rotating mirror housing.

FIG. 3a shows a side view of the drive mechanism for the rotating mirror housing.

FIG. 3b shows a sectional cuttaway top view of the rotating mirror housing.

FIG. 4 shows a cuttaway side view of the evacuator.

FIG. 4a shows a cuttaway side view of the evacuator with a turbine engine mounted inside.

REFERENCE NUMERALS IN THE DRAWINGS

| | |
|---|---|
| 9 | Radar gun |
| 10 | Laser generator |
| 15 | laser beam |
| 20 | drill pipe |
| 25 | Stationary mirror |
| 30 | Rotating mirror housing |
| 35 | Angled mirrors |

-continued

| | |
|---|---|
| 36 | Timing mirror |
| 40 | Support ring |
| 45 | Needle bearings |
| 46 | Input shaft |
| 47 | Input gear |
| 48 | Idler gear |
| 49 | Idler shaft |
| 50 | Fan |
| 51 | Transfer gear |
| 52 | Output shaft |
| 53 | Drive gear |
| 54 | Lower housing |
| 55 | Roller recesses |
| 56 | Upper housing |
| 57 | Light sensitive diode |
| 60 | Roller |
| 65 | Roller pin |
| 70 | Ring gear |
| 75 | Shoulder |
| 80 | Casing |
| 85 | Vacuum manifold |
| 90 | Seal |
| 95 | Vacuum pipe |
| 100 | Vacuum chamber |
| 105 | Elongated opening |
| 106 | Extension duct |
| 107 | Actuators |
| 110 | Air duct |
| 115 | Entry hatch |
| 120 | Turbine engine |

DESCRIPTION OF THE INVENTION

The description of two new apparatuses will help enable one skilled in the art to better understand and utilize the present invention.

Figure 5:
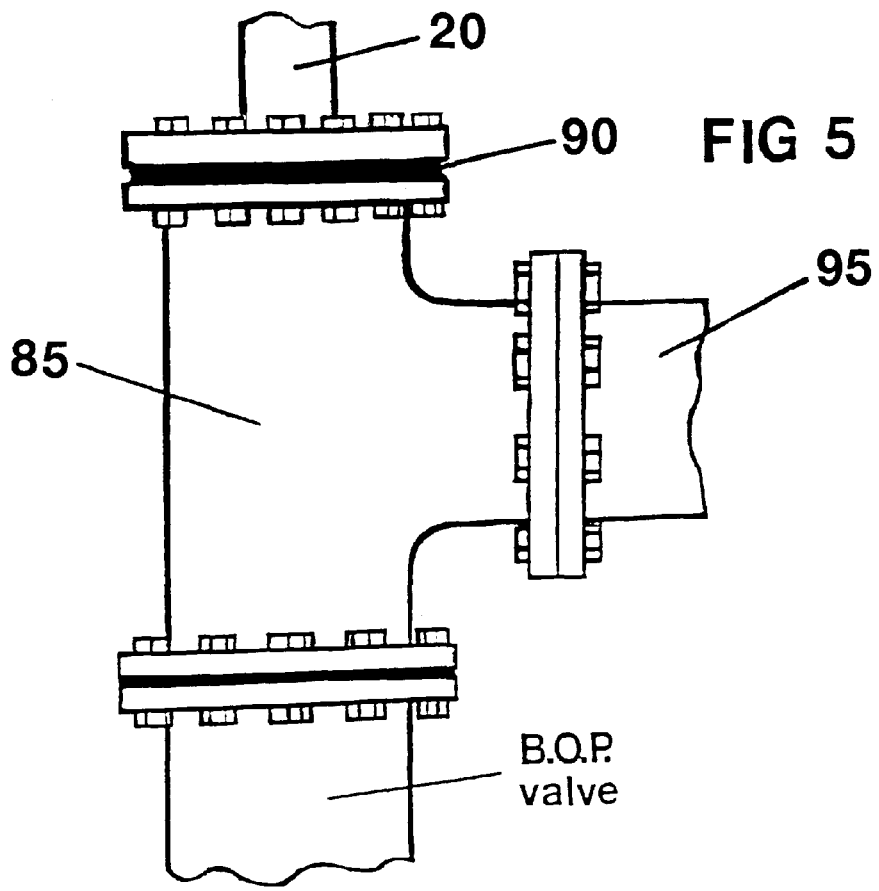
FIG. 5 shows a side view of the vacuum manifold.

The first apparatus added to this new method of laser drilling is an evacuator, utilized to apply a sub-atmospheric pressure to the drill hole, enhancing the laser's effective range and removing the smoke, ashes and gases produced by laser drilling, with a constant air flow circulating within the drill hole. As shown in FIGS. 4 and 4a, an evacuator can be described as a bulbous shaped vacuum chamber 100, condensing conically to a cylindrical elongated opening 105. Situated around and extending beyond the elongated opening 105, is the cylindrical extension duct 106, moved extensionally by actuators 107. Mounted steady and centered within the elongated opening 105, is the air duct 110, a cylindrical pipe, open at both ends and extending from the elongated opening's throat, curving upwardly in a sweeping curve, then exiting through the wall of the chamber 100, as it curves to a parallel position with the elongated opening 105. Mounted within the air duct's end, exterior of the chamber, is a fan driven by an engine. In FIG. 4a, a turbine engine 120, is mounted in the air duct at the elongated opening's end as an alternate source of propulsion. Opposite of the elongated opening 105, is the vacuum pipe 95, entering through the wall of the chamber 100. At the bottom most part of the chamber 100, is the entry hatch 115. In FIG. 5, the vacuum pipe 95, is bolted to the vacuum manifold 85. The vacuum manifold 85, holds the seal 90, around the drill pipe 20, and is bolted on top of a blow-out prevention valve at the well head. The well's surface casing 80, extends to bedrock to anchor the well head.

The second apparatus added is the rotating mirror housing 30, used to reflect the laser beam to different areas of the bottom surface of the hole. Referring to the drawings in FIG. 3, 3a and 3b, the rotating mirror housing 30, is a cylindrical metal housing, having a substantial wall there around, with a smaller outside diameter in the lower section, leaving a shoulder 75, there around the housing. The shoulder 75, setting and rotating on needle bearings 45. A support ring 40, holds the bearings 45, and the housing 30, within the bottom of the drill pipe 20. Spaced around the outside wall of the upper section of the housing 30, are roller recesses 55, cut for the rollers 60, that are held in place and rotate on roller pins 65. The roller pins 65, are installed through the rollers 60, from the top surface of the housing 30. Mounted to the top surface of the housing 30, and having the same inside diameter as the housing is the ring gear 70. The ring gear 70, with outwardly pointing teeth, has a smaller outside diameter than the upper section of the housing 30, leaving space for the drive gear 53. The inside wall of the rotating mirror housing 30, as shown in FIG. 2, has been sectionally machined to have small flat surfaces for the angled mirrors 35, all cut at different angles from a horizontal and vertical plane, to reflect the laser beam 15, to various positions of the bottom surface of the hole. One of these machined surfaces is cut very short in width, and at such an angle as to reflect a pulse of the laser beam 15, upward, as it passes through the beam, to be captured by the light sensitive diode 57, FIG. 1, the light sensitive diode receiver is mounted under the laser generator 10. This pulse of laser light from the timing mirror 36, is used for determining the revolutions per minute (RPM) of the rotating mirror housing 30. The angled surfaces of the housing can be polished brightly, as to efficiently reflect the laser beam 15, or mirrors can be fastened to them. The rotation of the housing 30, is provided by the air flow through the drill pipe 20, acting on the fan of the drive mechanism, in FIG. 3a. When the fan 50, turns it drives the input gear 47, also connected to input shaft 46, which drives the idler gear 48, on the idler shaft 49, that drives the transfer gear 51, turning the drive gear 53, through the output shaft 52. The drive gear 53 turns the rotating housing by driving the ring gear 70. The fan and gears are keyed to the shafts in a normal fashion and the shafts are held in position between the lower housing 56, and the upper housing 54, with retainers.

Figure 1:
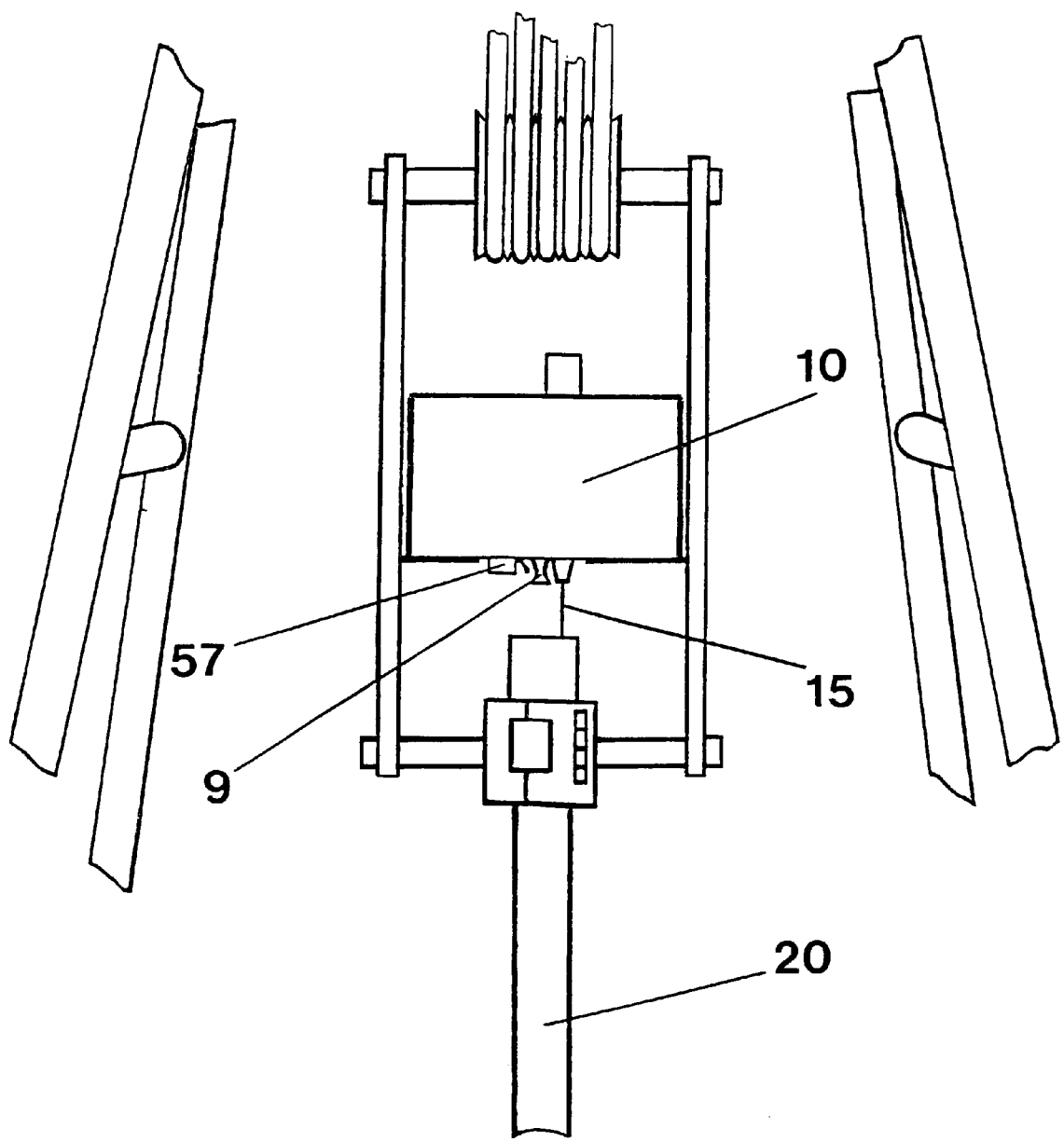
FIG. 1 shows the upper section of a laser drilling rig.
Figure 2:
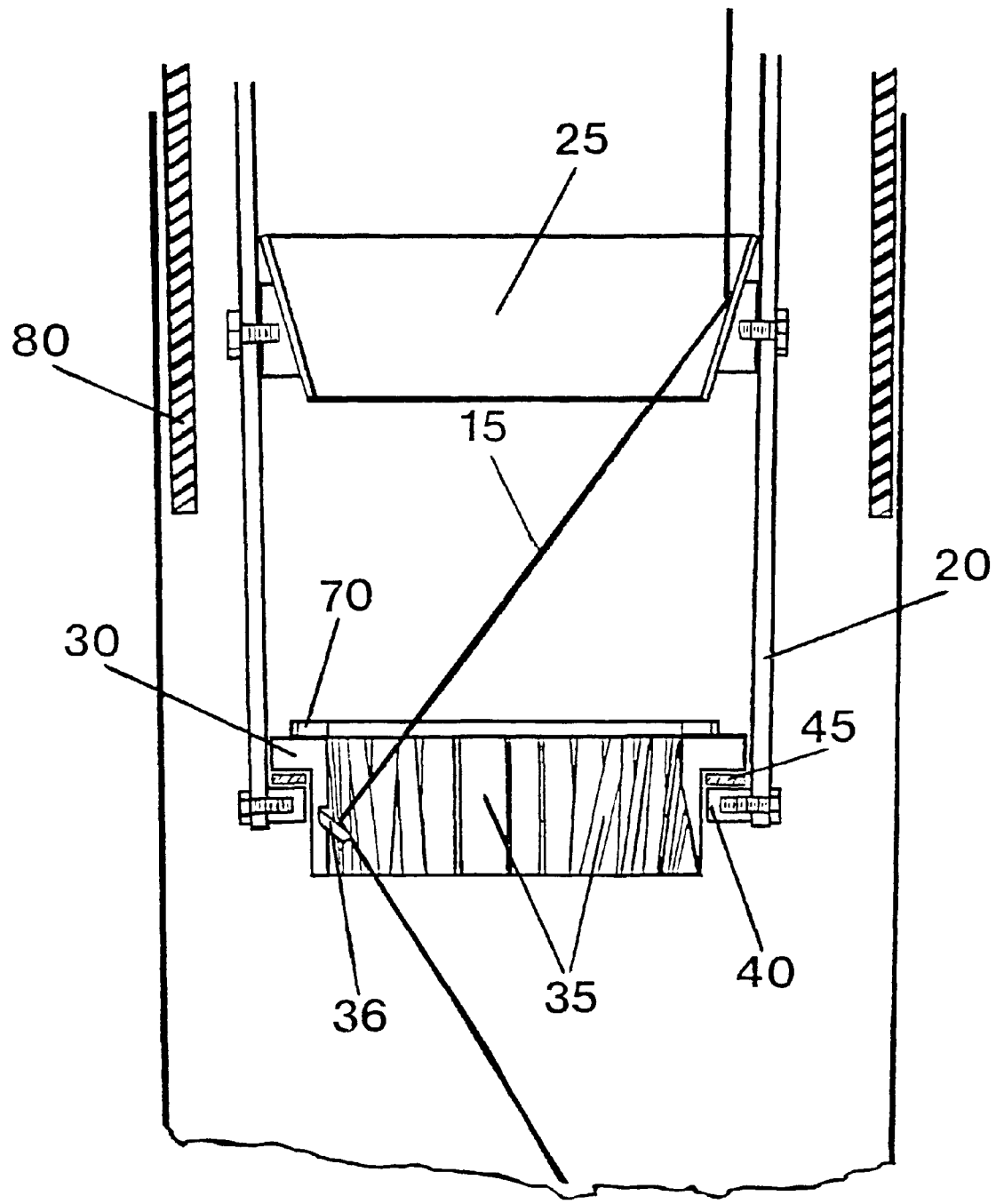
FIG. 2 shows a cross section view of the bottom of a laser drill string.
Figure 6:
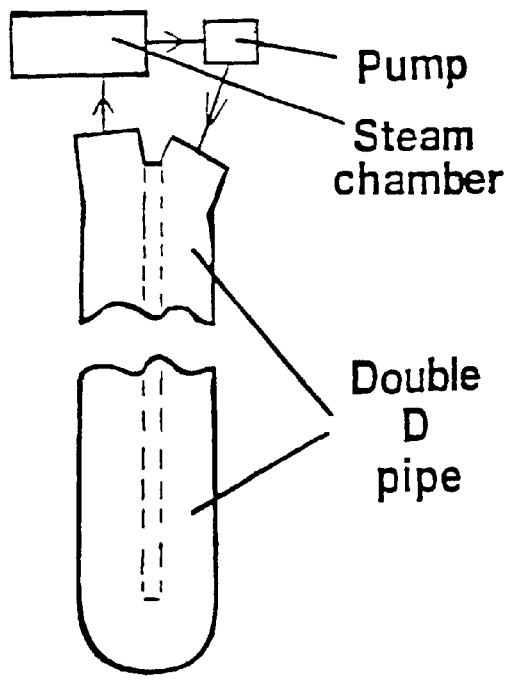
FIG. 6 shows a schematic drawing of the heat transfer system.
Figure 6A:
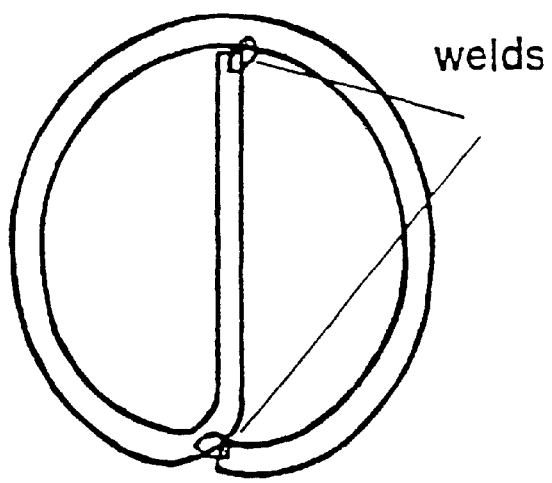
FIG. 6a shows a top view of the double D pipe.

FIG. 1 shows the drill pipe 20, suspended in the elevators of a drilling rig in the normal fashion. Mounted above the drill pipe 20, is the laser generator 10, emitting the laser beam 15, down the drill pipe 20. Mounted under the generator is the multiple targeting radar gun 9, and the light sensitive diode receiver 57, with it's collecting mirror. FIG. 2 shows the laser beam 15, traveling near the inner wall of the drill pipe 20, striking the stationary mirror 25, a conical shaped reflecting device having a larger diameter at the top, condensing to a smaller diameter at the bottom of the device, fitting and mounted inside the drill pipe 20, reflecting the laser beam 15, to the rotating mirror housing 30, striking one of the angled mirrors 35, reflecting the beam to the bottom of the hole. As the rotating mirror housing 30, turns, each of the angled mirrors is brought into the path of the beam and reflects it to different parts of the hole. The housing 30, is ridding on needle bearings 45, mounted in the bottom of the drill pipe 20, on the support ring 40. Also shown in FIG. 2 is the surface casing 80. FIG. 5 shows the vacuum manifold 85, with the drill pipe 20, passing through the seal 90, also shown is the vacuum pipe 95, and the blow out prevention valve. FIG. 6 is a schematic drawing of the closed circulating heat transfer system having a steam chamber and a pump to move a nongasous fluid through the system, including the down hole double D pipe, also shown in FIG. 6a. This pipe can be maid in the normal process used to roll flat stock into pipe by adding a second continuous welder to the rolling line and making the first bend tighter than the rest of the roll. As the stock rolls to the edge of the flat section, now to be the center wall, the extra welder would join the wall to the inside surface of the stock still being rolled, this would have a D shape, the rolling process then continues until the final edge reaches the first bend and then welded there, becoming a double D pipe. For joining the pipe vertically, a chamfer or groove is cut into the center wall of both ends, when the two pieces come together, a tenon or key is placed into the groove, now the two pipes can be aligned and welded together. For added strength a slip collar could be placed over the weld and welded to both sections of pipe.

Operation of the Invention

After the spud-in process is completed, the surface casing and the blow-out prevention valve are put in place in the normal fashion. The vacuum manifold 85, is bolted on top of the blow-out prevention valve FIG. 5, and the vacuum pipe 95, is connected to the vacuum chamber 100. The first section of drill pipe 20, with the stationary mirror 25, and the rotating mirror housing 30, mounted inside, is lowered through the seal 90, into the hole. At this point the radar gun 9, is turned on, this is to measure the relationship between the rotating mirror housing 30, and the bottom of the hole. The drill is lowered to bring the rotating mirror housing 30, to a close relationship to the bottom of the hole, this distance will vary depending on the diameter of the hole desired. When the drill is in position the evacuator FIG. 4, is started. As the vacuum is applied to the hole, air begins to flow down through the drill pipe 20, past the rotating housing 30, turning the fan 50, on the drive mechanism FIG. 3a, which rotates the housing 30. The air flow returns to the surface and into the vacuum chamber 100, through the manifold 85, and vacuum pipe 95. When the air flow is up to speed a vacuum will be present within the hole, indicated by a vacuum gauge at the operators station. The laser generator 10, is now turned on and the beam is brought into phase. A tachometer will indicate to the operator that the rotating mirror housing 30, is up to speed. The tachometer receives this information from the light sensitive diode 9, receiving a pulse of the laser beam 15, each time the timing mirror 36, passes through the laser beam. The laser beam is fired down the drill pipe 20, striking the stationary mirror 25, then into the rotating mirror housing 30. The laser beam is then reflected to different spots on the bottom of the hole as the angled mirrors 35, pass by. The operator now lowers the drill pipe 20, into the hole at a rate as to keep the rotating housing 30, at the determined distance from the bottom of the hole with the information returned by the radar gun 9. When more drill pipe 20, is needed as the hole progresses, the laser generator is turned off, time is allowed for the evacuator FIG. 4, to clear the hole of smoke, then the evacuator is turned off. Slips or clamps are set in place to secure the drill pipe 20, while the elevators of the rig are released and raised to latch onto the next section of drill pipe and lift it to make the connection to the previous piece of drill pipe. When the connection is complete the slips are removed and the evacuator is started again, when the vacuum is established the laser generator 10, is started and drilling continues. As the hole progresses deeper, focus lenses may be required and installed into the drill pipe 20, also inert gases such as argon or nitrogen may be introduced at the top of the drill string. When the evacuator FIG. 4, becomes full of debris, drawn from the hole, it can be emptied during a drill pipe connection, while it is shut down, by opening the entry hatch 115. At the completion of the hole, determined by the temperature of the rock reached, the laser generator 10, is turned off, time is given to evacuate the hole, then the evacuator is shut down and the drill pipe is removed. The slips are used each time a drill pipe connection is broken to keep the remaining drill pipe from falling into the hole. When the drill pipe is removed, the vacuum manifold 85, is removed as is the blow-out prevention valve. With only the surface casing 80, left in the hole, the double D pipe of FIG. 6 and 6a, can be installed. The first section of double D pipe is the end cap piece, as shown in the lower section of FIG. 6. The rig lowers this piece into the hole, until about 5 feet are left exposed above the floor of the rig, the slips are set, the elevators are released and raised to lift the next section of double D pipe. The tenon or key is installed into the center wall of the first pipe, the center walls are aligned as the upper pipe is lowered to make contact. The two pipes are then welded together. The slips are removed and the upper section, now connected to the lower section, is lowered into the well, the slips are set and the next connection can be made. This process is repeated until the double D pipe reaches the bottom of the hole. A splitter pipe, as shown in the upper section of FIG. 6, is installed at the top of the double D pipe and ran to the steam chamber, after leaving the steam chamber, two t's with valves are installed in the pipe, for filling the system, then the pipe is ran to the pump and back to the splitter, completing the circuit. The system can now be filled. Filling the system is accomplished with the two t's in the pipe, one to fill and the other to bleed off the air in the system. For backup reasons a second pump should be plumbed into the system, primed and isolated with valves.

Summary, Ramifications, and Scope

Accordingly, the reader will see that this method of dry hole drilling accomplishes the goal of reaching a much need natural resource, by overcoming previous barriers with the advantage of Keeping the vapors and debris from clouding the reflecting surfaces needed for laser drilling, with an air flow used to:

Remove the drill cuttings from the hole while maintaining a vacuum in the whole.

Providing a favorable enviornment for the use of a laser within the hole.

Rotating a reflecting device remotely without extending a mechanical device from the surface to drive it.

The heat recovery system begins to re-heat the heat transfer fluid as soon as it enters the well, through the shared wall of the double D pipe.

Although the description above contains many specificities, these should not be confused as limiting the scope of the invention but to provide illustrations of some of the presently preferred embodiments of this invention. For example the angled mirrors of the rotating mirror housing could be a reflecting surface, transitioning to different angles with rolling, sweeping and curving surfaces. Also the heat transfer system could be one of many existing systems, however the double D system would be the most efficient.

Thus the scope of the invention should be determined by the appended claims and their legal equivalents, rather than the examples given.

What is claimed is:

1. Apparatus for laser drilling into subterranean heat and transferring said heat to the surface comprising:

a drilling rig having at least one elevator, a laser generator, a radar gun, a light sensitive diode receiver, said generator, radar gun and diode being mounted within the elevators of said drilling rig and vertically movable therein, a drill pipe, a conical shaped stationary mirror attached to the inside of said drill pipe, a second reflecting device having a plurality of angled reflecting surfaces mounted within a rotating housing located adjacent the lower end of said drill pipe and rotated by a fluid driven mechanism, an evacuator creating a sub-atmospheric pressure within the hole, and Means for recovering heat from said hole using a pipe having multiple passages.

* * * * *